US012789214B2

(12) United States Patent
Sprouse, II et al.

(10) Patent No.: US 12,789,214 B2
(45) Date of Patent: Nov. 10, 2026

(54) ASSEMBLIES FOR SECURING PERSONAL ITEMS AND METHODS OF USING

(71) Applicant: Security Equipment Corporation, Fenton, MO (US)

(72) Inventors: Anthony E. Sprouse, II, Caseyville, IL (US); David Nance, Chicago, IL (US)

(73) Assignee: Security Equipment Corporation, Fenton, MO (US)

(*) Notice: Subject to any disclaimer, the term of this patent is extended or adjusted under 35 U.S.C. 154(b) by 250 days.

(21) Appl. No.: 18/437,437

(22) Filed: Feb. 9, 2024

(65) Prior Publication Data

US 2024/0367193 A1 Nov. 7, 2024

Related U.S. Application Data

(60) Provisional application No. 63/500,091, filed on May 4, 2023.

(51) Int. Cl.
*B05B 15/62* (2018.01)

(52) U.S. Cl.
CPC .................................... *B05B 15/62* (2018.02)

(58) Field of Classification Search
CPC ...... A45F 2005/008; A45F 5/00; A45F 5/021; A45F 5/1566; F41H 9/10; Y10S 224/914; Y10S 362/00; Y10S 362/80; Y10S 362/806
USPC .......................................................... 224/218
See application file for complete search history.

(56) References Cited

U.S. PATENT DOCUMENTS

| | | | | | |
|---|---|---|---|---|---|
| 4,349,705 | A * | 9/1982 | Kuhfus | H04M 1/22 | 362/23.06 |
| 4,463,879 | A * | 8/1984 | Des Voignes | F41H 9/10 | 224/217 |
| 4,477,005 | A * | 10/1984 | Martinez | B65D 83/384 | 224/249 |
| 4,523,258 | A * | 6/1985 | Morse | G08B 5/38 | 362/108 |
| 5,374,919 | A * | 12/1994 | Zelka | G08B 15/004 | 224/664 |
| 5,503,316 | A * | 4/1996 | Stewart | B60R 7/05 | 224/901.4 |
| 5,515,247 | A * | 5/1996 | Cheung | A44C 5/0007 | 362/108 |
| 7,922,349 | B2 * | 4/2011 | Hunnewell | A45F 5/02 | 362/108 |
| 10,013,962 | B2 * | 7/2018 | Washington | G10G 5/005 | |
| 11,231,250 | B1 * | 1/2022 | Fisher | F41H 13/0081 | |

(Continued)

*Primary Examiner* — Adam J Waggenspack
(74) *Attorney, Agent, or Firm* — Hartman Global IP Law; Gary M. Hartman; Domenica N. S. Hartman

(57) ABSTRACT

Assemblies adapted to secure personal items, such as pepper spray devices. Such an assembly includes an elastic sleeve having a tubular shape that defines an internal passage and oppositely-disposed upper and lower open ends, and a retention strap spanning the lower open end of the elastic sleeve. A personal safety device is removably disposed within the internal passage, a deployment end of the personal safety device protrudes through the upper open end of the sleeve through which the personal safety device is removable, and the retention strap engages a second end of the personal safety device to prevent the personal safety device within the elastic sleeve from entirely exiting the internal passage through the lower open end.

8 Claims, 6 Drawing Sheets

(56) References Cited

U.S. PATENT DOCUMENTS

| | | | | |
|---|---|---|---|---|
| 11,819,068 | B2 * | 11/2023 | Menshouse | A41D 13/01 |
| 2008/0087695 | A1 * | 4/2008 | Froelich | F41C 33/02 224/245 |
| 2015/0335135 | A1 * | 11/2015 | Stoll | F21L 4/08 362/108 |

* cited by examiner

ASSEMBLIES FOR SECURING PERSONAL ITEMS AND METHODS OF USING

CROSS-REFERENCE TO RELATED APPLICATIONS

This application claims the benefit of U.S. Provisional Application No. 63/500,091 filed May 4, 2023, the contents of which are incorporated herein by reference.

BACKGROUND OF THE INVENTION

The present invention generally relates to personal accessories, and particularly relates to assemblies adapted to secure a personal item, particularly safety devices such as but not limited to a pepper spray device.

Dispensers adapted to dispense repellents, such as a pepper gel, mace, pepper spray, or other chemical irritant (hereinafter sometimes referred to as pepper spray as a matter of convenience) are prevalent personal safety devices. To facilitate access to a repellent dispenser during activities such as walking, jogging, etc., articles in the form of harnesses, sleeves, and various other items have been developed to secure a dispenser in a manner that minimally encumbers a user while participating in an activity, and provide quick access to the dispenser in the event of an urgent need to use the repellent against a perceived attacker. Still, there is an ongoing desire for articles and other means that are capable of securing a repellent dispenser and offers a variety of safety features.

BRIEF SUMMARY OF THE INVENTION

The intent of this section of the specification is to briefly indicate the nature and substance of the invention, as opposed to an exhaustive statement of all subject matter and aspects of the invention. Therefore, while this section identifies subject matter recited in the claims, additional subject matter and aspects relating to the invention are set forth in other sections of the specification, particularly the detailed description, as well as any drawings.

The present invention provides, but is not limited to, assemblies adapted to secure personal items, including but not limited to personal safety devices, particular but nonlimiting examples of which include repellent dispensers such as pepper spray devices.

According to a nonlimiting aspect of the invention, an assembly includes a personal safety device having a deployment end and an oppositely-disposed second end, an elastic sleeve having a tubular shape that defines an internal passage and oppositely-disposed upper and lower open ends that are defined by the internal passage therebetween, and a retention strap spanning the lower open end of the elastic sleeve. The personal safety device is removably disposed within the internal passage and the elastic sleeve is sized to elastically expand to receive and elastically secure the personal safety device within the internal passage. The deployment end of the personal safety device protrudes through the upper open end of the sleeve, and the personal safety device is removable through the upper open end without obstruction other than friction between the personal safety device and the elastic sleeve created by the elastic sleeve elastically expanding to receive and elastically secure the personal safety device within the internal passage. The retention strap engages the second end of the personal safety device to prevent the personal safety device within the elastic sleeve from entirely exiting the internal passage through the lower open end.

According to another nonlimiting aspect of the invention, an assembly is provided that is adapted to secure a personal item. The assembly includes a hand-securable strap assembly comprising first and second strap sections defining opposite first and second ends of the hand-securable strap assembly. Complementary securement means are provided at the first and second ends of the hand-securable strap assembly for releasably closing the hand-securable strap assembly into a loop. An illumination unit within the first strap section renders the first strap section visible in lighting conditions of lower intensity than daylight conditions. An elastic sleeve is attached to the hand-securable strap assembly between the first and second ends thereof. The elastic sleeve has a tubular shape that defines an internal passage in which the personal item can be removably secured, and oppositely-disposed upper and lower open ends that are defined by the internal passage therebetween.

Other nonlimiting aspects of the invention include methods of using hand-securable strap assemblies comprising the elements described above.

Technical aspects of assemblies and methods having features as described above preferably include the ability to secure a personal safety device with the assembly for quick accessibility to a person on whom the assembly is secured, e.g., the person's hand, arm, etc., in the event of the person being attacked. Additionally, the assembly may optionally include an illumination unit capable of sufficiently illuminating a portion of the assembly so that the assembly can be seen in low lighting conditions, for example, when the assembly is worn by a person (e.g., wrapped around a hand or arm) while walking or jogging in post-dusk or predawn hours.

Other aspects and advantages will be appreciated from the following detailed description.

DETAILED DESCRIPTION OF THE INVENTION

Figure 1:
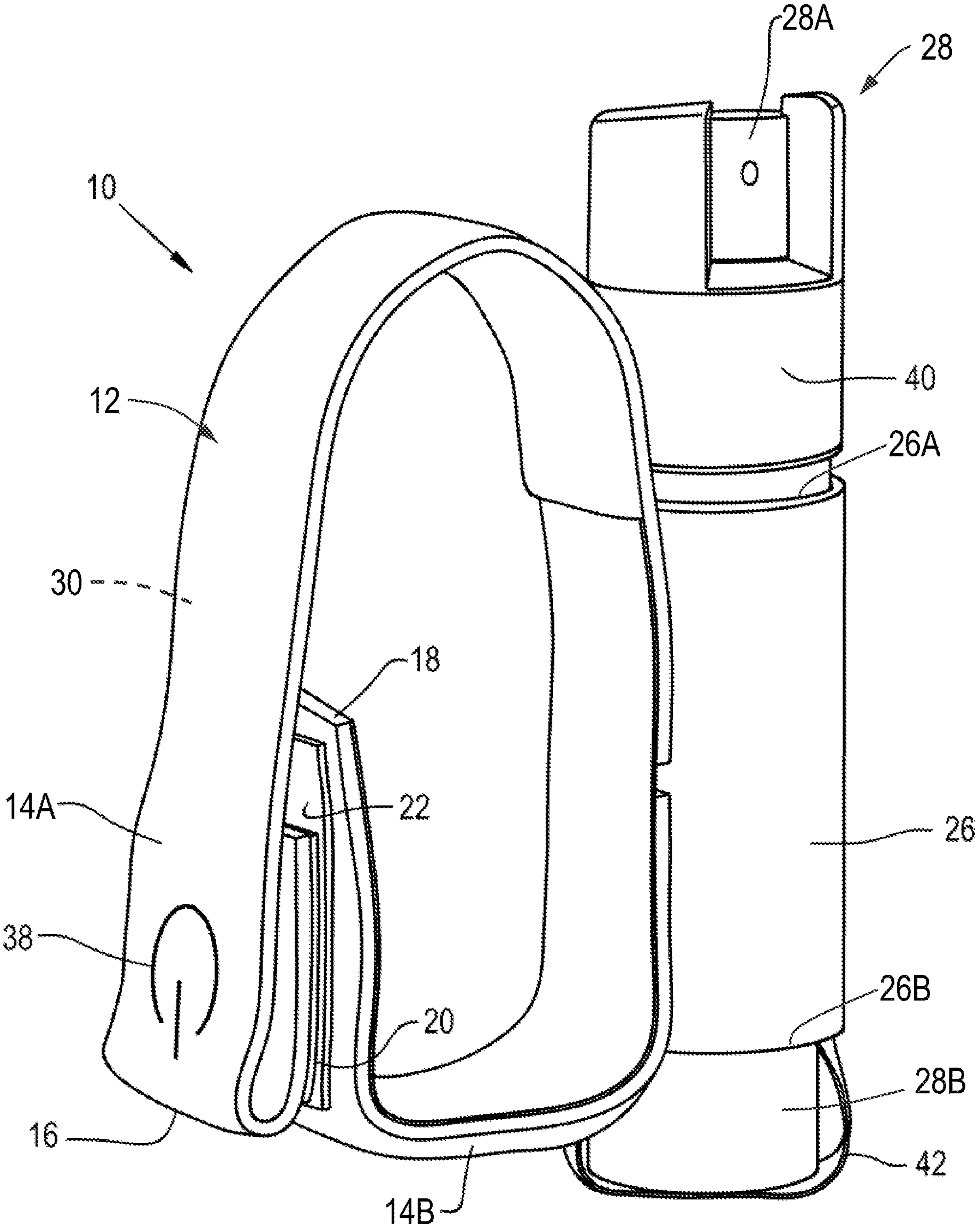
FIG. 1 schematically represents a hand-securable assembly in a closed loop configuration in accordance with a nonlimiting embodiment of this invention.

The intended purpose of the following detailed description of the invention and the phraseology and terminology employed therein is to describe what is shown in the drawings, which include the depiction of and/or relate to one or more nonlimiting embodiments of the invention, and to describe certain but not all aspects of what is depicted in the drawings. The following detailed description also identifies certain but not all alternatives of the embodiment(s) depicted in the drawings. As nonlimiting examples, the invention encompasses additional or alternative embodiments in which one or more features or aspects shown and/or described as part of a particular depicted embodiment could be eliminated, and also encompasses additional or alternative embodiments that combine two or more features or aspects shown and/or described as part of different embodiments. Therefore, the appended claims, and not the detailed description, are intended to particularly point out subject matter regarded to be aspects of the invention, including certain but not necessarily all of the aspects and alternatives described in the detailed description.

FIGS. 1 through 7 schematically represent nonlimiting embodiments of hand-securable assemblies 10 adapted to secure personal items, including but not limited to personal safety devices, particular but nonlimiting examples of which include repellent dispensers such as pepper spray devices. The terms "strap" and "strap assembly" will be generically used herein as a matter of convenience and is in reference to articles depicted in the drawings in the form of a loop or capable of being arranged in the form of a loop, including but not limited to a one or more straps having two opposing ends that can be coupled directly together or coupled indirectly in some manner to form a loop. Some of the drawings depict pepper spray devices 28 as exemplary personal items capable of being secured with the assembly 10, though it is within the scope of the invention that other items can be similarly secured. For convenience, consistent reference numbers are used throughout FIGS. 1 through 7 to identify the same or functionally related/equivalent elements of the various embodiments of the assemblies 10 represented in the drawings.

Figure 2:
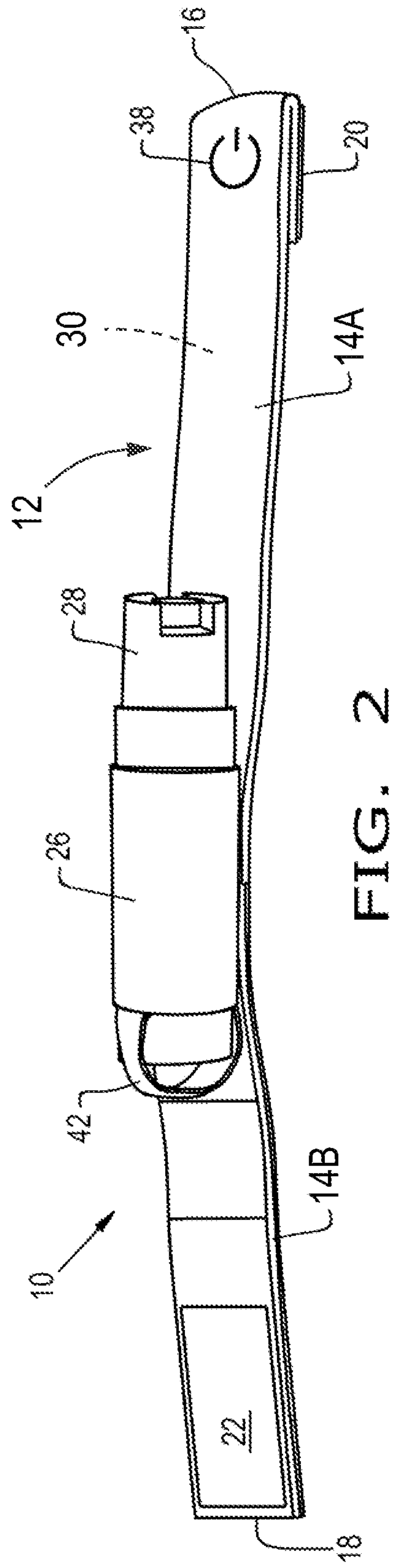
FIG. 2 schematically represents the hand-securable assembly of FIG. 1 in an unclosed configuration.

In FIGS. 1 and 2, a first embodiment of the assemblies 10 is represented as having a hand-securable strap assembly 12 having first and second strap sections 14A and 14B that define, respectively, oppositely-disposed first and second ends 16 and 18 of the strap assembly 12. Fastening means, represented as hook-and-loop complementary fasteners 20 and 22, are disposed at, respectively, the first and second ends 16 and 18 of the assembly 10 as securement means for closing the strap assembly 12 into a closed loop in which the ends 16 and 18 of the strap sections 14A and 14B are releasably joined together (FIG. 1). The size of the loop is adjustable to enable the strap assembly 12 to be worn on (e.g., wrapped around) a hand of a person such that their hand is secured within the loop. Though hook-and-loop complementary fasteners 20 and 22 are desirable as a matter of cost and convenience, the use of other fastening means is foreseeable, including but not limited to magnets, complementary studs and holes, etc. Furthermore, the strap sections 14A and 14B make be separate components of the strap assembly 12, or the strap assembly 12 may comprise a singular continuous strap that defines both strap sections 14A and 14B, for example, an elastic strap sized to elastically fit a range of sizes of human hands, human arms, belt loops, or other clothing accessory suitable for use as a securement site.

An elastic sleeve 26 is attached to the strap assembly 12, and in the embodiment shown is permanently attached (e.g., sewn, bonded, etc.) to the first strap section 14A so as to be parallel thereto. In FIGS. 1 and 2, a pepper spray device 28 is shown as secured within the elastic sleeve 26 and accessible for use while within the sleeve 26, for example, in the event of an attack, and also easily removable from the sleeve 26 for use in the event of an attack. For this purpose, the elastic sleeve 26 has a tubular shape that defines an internal passage and oppositely-disposed upper and lower open ends 26A and 26B that are defined by the internal passage therebetween. The pepper spray device 28 is removably disposed within the internal passage and the elastic sleeve 26 is sized to elastically expand to receive and elastically secure the pepper spray device 28 within the internal passage. As represented in FIG. 1, the pepper spray device 28 has a deployment end 28A that protrudes through the upper open end 26A of the sleeve 26 and the pepper spray device 28 is removable through the upper open end 26A without obstruction other than friction between the pepper spray device 28 and the elastic sleeve 26 created by the sleeve 26 elastically expanding to receive and elastically secure the pepper spray device 28 within the internal passage of the sleeve 26. A retention strap 42 is shown as spanning the lower open end 26B of the elastic sleeve 26 and engaging a second end 28B of the pepper spray device 28 to prevent the device 28 within the elastic sleeve 26 from entirely exiting its internal passage through the lower open end 26B.

Figure 3:
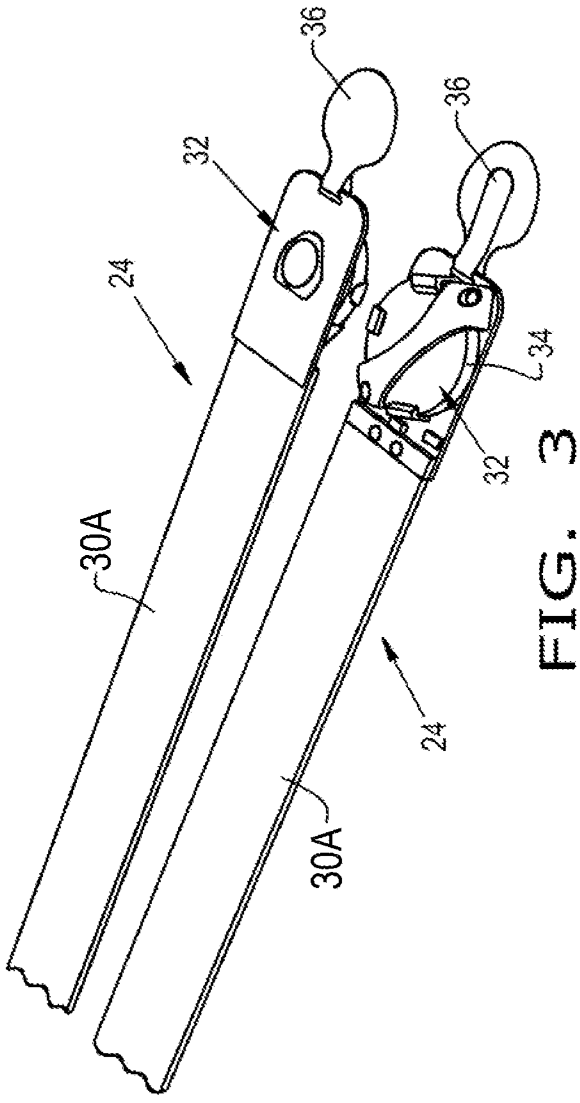
FIG. 3 schematically represents opposite sides of one end of the hand-securable assembly of FIG. 1, and reveals an illumination unit of the assembly.

The strap assembly 12 or any of its first and second strap sections 14A and 14B may incorporate an illumination means having a glow-in-the-dark capability to provide the user with the ability to locate the assembly 10 in dimly lit conditions and/or as a visual for others in dimly lit conditions for visual safety of the user. Such means may be located in one or both of the first and second strap sections 14A and 14B, and may be an electrically-powered element incorporated into the strap sections 14A and/or 14B or an element formed of a material that does not require a source of electrical energy and instead fluoresces when exposed to light. As a nonlimiting example, FIG. 3 represents an isolated view of an electrically-powered illumination unit 24 adapted to be disposed within the first strap section 14A, which is preferably formed of a relatively light color so that the first strap section 14A appears to glow or fluoresce when lighted by the illumination unit 24. The illumination unit 24 includes a light-emitting member 30A in the form of a strip that can be inserted into and preferably entirely encased within at least a portion and more preferably along the entire length of the first strap section 14A so that, when illuminated, the light-emitting member 30A is able to cause the first strap section 14A to glow or otherwise be sufficiently lit to be easily seen in low light conditions, for example, while a person wearing the assembly 10 is walking or jogging in post-dusk and predawn hours. The light-emitting member 30A may be, as a nonlimiting example, formed of a fluorescent material or a hollow tube whose interior can be illuminated with a light source, for example, a light-emitting diode (LED).

The illumination unit 24 further includes a battery compartment 32 coupled to the light-emitting member 30A. The battery compartment 32 is shown as containing a battery 34, and a switch 36 is electrically and physically coupled to the battery compartment 32 for delivering electrical power to the light-emitting member 30A or to a light source for the light-emitting member 30A when the switch 36 is closed. The switch 36 is operable through a region of the end 16 of the first strap section 14A denoted with a power emblem 38. In a preferred but nonlimiting operating mode, pressing the switch 36 once energizes the light-emitting member 30A, pressing the switch 36 twice in succession causes the light-emitting member 30A to flash, and pressing the switch 36 a third time turns the light-emitting member 30A off.

While a pressure-actuated switch 36 is represented and described, other types of switches are also within the scope of the invention, as examples, rocker switches and slider switches.

As represented in FIG. 1, a reflective material 40 may be present on the pepper spray device 28 and/or the sleeve 26 of the assembly 10 to provide additional visibility when an external light is shined toward the user/wearer, for example, when a vehicle headlight illuminates the user/wearer. Additionally, the reflective material 40 may serve as a backup to the glow of the first strap section 14A in the event that the light emitted by the light-emitting member 30A has dimmed, e.g., the battery 34 has partially or fully lost power.

FIGS. 4 through 7 represent further embodiments of assemblies 10 within the scope of the invention. In view of similarities between the different embodiments, the following discussion of FIGS. 4 through 7 will focus primarily on aspects of the additional embodiments that differ from the embodiment of FIGS. 1 through 3 in some notable or significant manner. Other aspects of the embodiments of FIGS. 4 through 7 not discussed in any detail can be, in terms of structure, function, materials, etc., essentially as was described for the embodiment of FIGS. 1 through 3.

Figure 4:
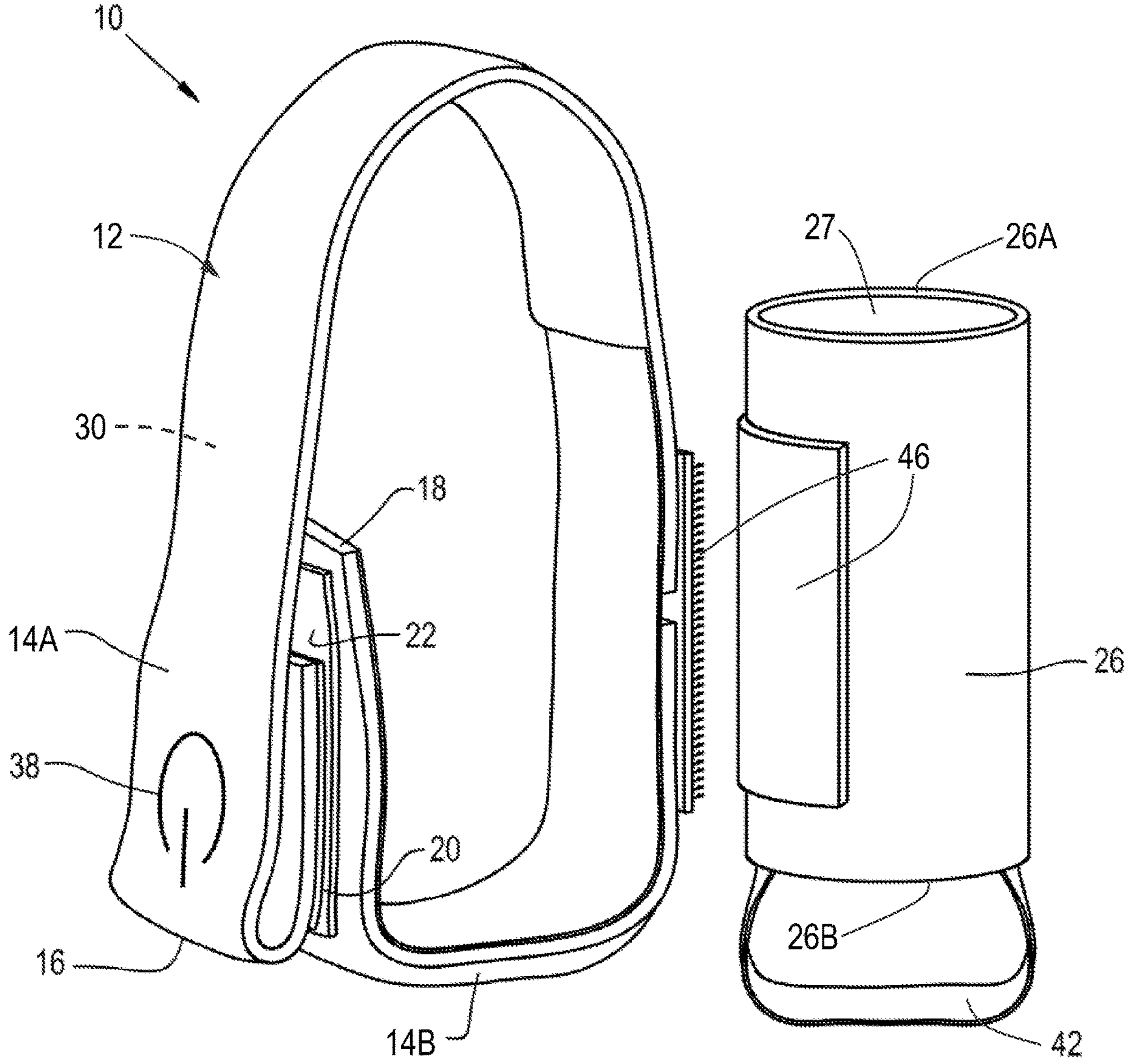
FIG. 4 schematically represents a hand-securable assembly in a closed loop configuration in accordance with another nonlimiting embodiment of this invention.
Figure 5:
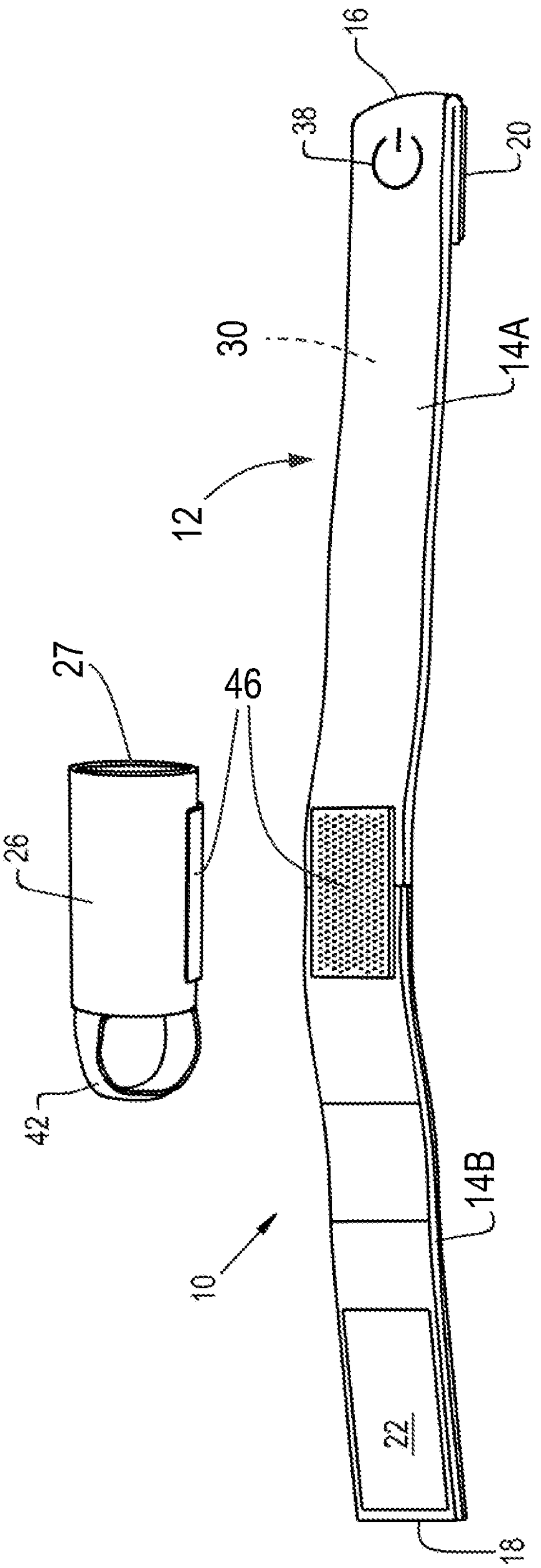
FIG. 5 schematically represents the hand-securable assembly of FIG. 4 in an unclosed configuration.

The elastic sleeve 26 of FIGS. 4 and 5 is represented as releasably attached to the strap assembly 12 with fastening means 46, in this example, complementary hook-and-loop fasteners, located on the strap assembly 12 and on the exterior of the elastic sleeve. In FIGS. 4 and 5, the internal passage of the sleeve 26 is visible and labeled with reference number 27.

Figure 6:
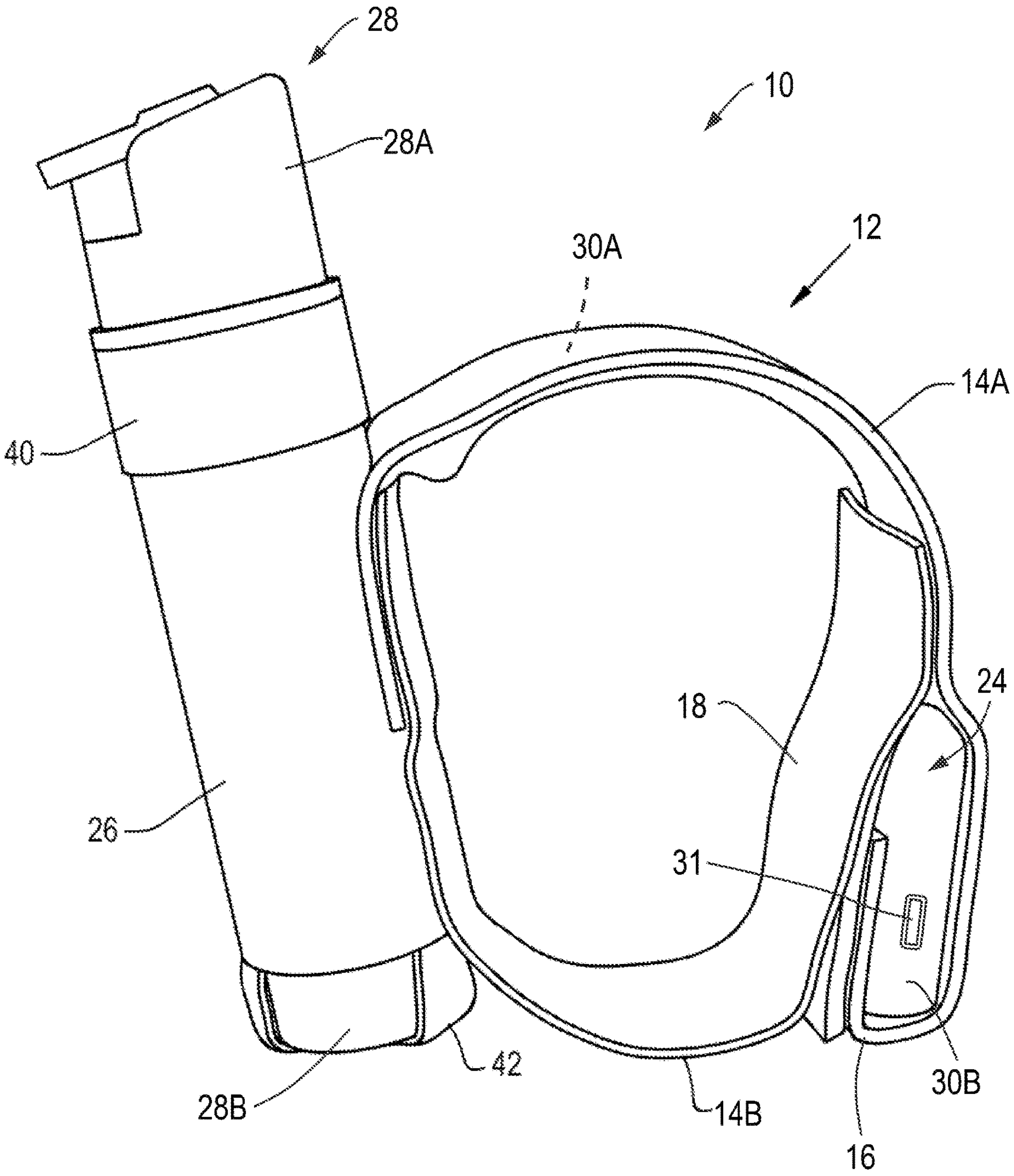
FIG. 6 schematically represents a hand-securable assembly in a closed loop configuration in accordance with another nonlimiting embodiment of this invention.

FIG. 6 represents the illumination unit 24 as comprising a light-emitting member 30A entirely encased within at least a portion and more preferably along the entire length of the first strap section 14A so that, when energized, the light-emitting member 30A is able to cause the first strap section 14A to glow or otherwise be sufficiently lit to be easily seen in low light conditions. The illumination unit 24 is shown in FIG. 6 as further comprising an electronics enclosure 30B capable of providing a watertight housing for the battery compartment 32 and switch 36 (not visible) of the light-emitting member 30A, and a charging port 31 for charging a rechargeable battery (if used). The enclosure 30B is represented in FIG. 6 as disposed at the end 16 of the first strap section 14A and secured by folding the first strap section 14A onto itself to form at least a partial loop. The electronics enclosure 30B is physically coupled to the light-emitting member 30A, and the light-emitting member 30A emits light by operating the switch 36. As a nonlimiting example, the light-emitting member 30A may utilize a light-generating means, such as an LED lamp that is located within the enclosure 30B, which emits light within the enclosure 30B and directs light through an internal cavity within the light-emitting member 30A, so that the light-emitting member 30A appears to glow. A switch (not shown) for electrically and physically coupling the battery compartment 32 to the light-emitting member 30A can be incorporated into the enclosure 30B, yet be operable through a region of the end 16 of the first strap section 14A denoted with a power emblem (e.g., 38 in FIGS. 1, 2, 4, and 5).

Figure 7:
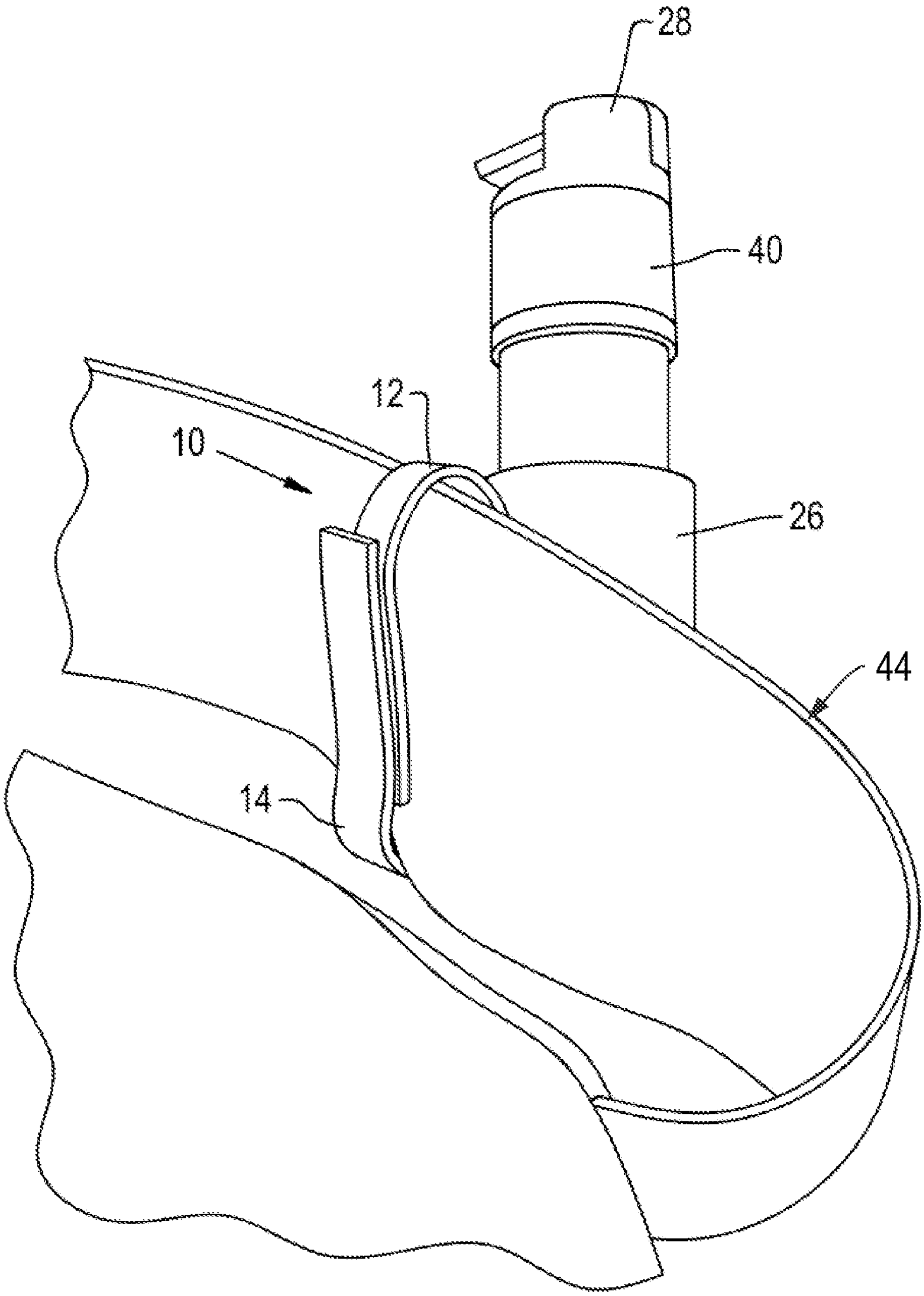
FIG. 7 schematically represents any one of the hand-securable assemblies of FIGS. 1 through 6 secured to a belt or a strap on an article of clothing, such as a vest.

Whereas the strap assembly 12 is described above as hand-securable, the strap assembly 12 can also be utilized to secure one of the assemblies 10 described above to other articles. As a nonlimiting example, FIG. 7 shows the strap assembly 12 as securing one of the assemblies 10 to a belt or strap 44 worn by the user or incorporated into a vest or other garment worn by the user.

As previously noted above, though the foregoing detailed description describes certain aspects of one or more particular embodiments of the invention, alternatives could be adopted by one skilled in the art. For example, the clips and their components could differ in appearance and construction from the embodiments described herein and shown in the drawings, functions of certain components of the clips could be performed by components of different construction but capable of a similar (though not necessarily equivalent) function, and various materials could be used in the fabrication of the clips and/or their components. As such, and again as was previously noted, it should be understood that the invention is not necessarily limited to any particular embodiment described herein or illustrated in the drawings.

The invention claimed is:

1. An assembly adapted to secure a personal item, the assembly comprising:

a hand-securable strap assembly comprising first and second strap sections defining opposite first and second ends of the hand-securable strap assembly;

complementary securement means at the first and second ends of the hand- securable strap assembly for releasably closing the hand-securable strap assembly into a loop;

an illumination unit within the first strap section that renders the first strap section visible in lighting conditions of lower intensity than daylight conditions, the illumination unit comprising a switch for operating the illumination unit and an electronics enclosure that houses a battery compartment, the electronics enclosure being disposed at the first end defined by the first strap section and being secured in at least a partial loop formed by folding the first strap section onto itself; and an elastic sleeve attached to the hand-securable strap assembly between the first and second ends thereof, the elastic sleeve having a tubular shape that defines an internal passage in which the personal item can be removably secured, the elastic sleeve having oppositely-disposed upper and lower open ends that are defined by the internal passage therebetween.

2. The assembly of claim 1, wherein the elastic sleeve is attached to the first strap section so as to be parallel thereto.

3. The assembly of claim 1, wherein the elastic sleeve is sewn or bonded to the hand securable strap assembly.

4. The assembly of claim 1, wherein the elastic sleeve is releasably attached to the hand securable strap assembly with complementary hook-and-loop features.

5. The assembly of claim 1, wherein the illumination unit comprises a light-emitting member extending through a length of the first strap section and the electronics enclosure within the first end of the first strap section is coupled to the light-emitting member, the light-emitting member and the electronics enclosure each utilizing light generating means so as to emit light therefrom.

6. The assembly of claim 1, further comprising a retention strap spanning the lower open end of the elastic sleeve.

7. The assembly of claim 6, wherein the personal item is a pepper spray device and is disposed within the internal passage of the elastic sleeve, the elastic sleeve being sized to elastically expand to receive and elastically secure the pepper spray device within the internal passage, the pepper spray device having a deployment end protruding through the upper open end of the sleeve, the pepper spray device being removable through the upper open end without obstruction other than friction between the pepper spray device and the elastic sleeve created by the elastic sleeve elastically expanding to receive and elastically secure the pepper spray device within the internal passage.

8. The assembly of claim 7, wherein the pepper spray device has a second end that protrudes through the lower open end of the sleeve and the retention strap engages the second end of the pepper spray device protruding through the lower open end of the sleeve to prevent the pepper spray device within the elastic sleeve from entirely exiting the internal passage through the lower open end.

* * * * *